Nov. 14, 1933.   J. E. JEWETT   1,934,716
METHOD OF TREATING FUSED MATERIAL AND APPARATUS THEREFOR
Filed Jan. 31, 1930
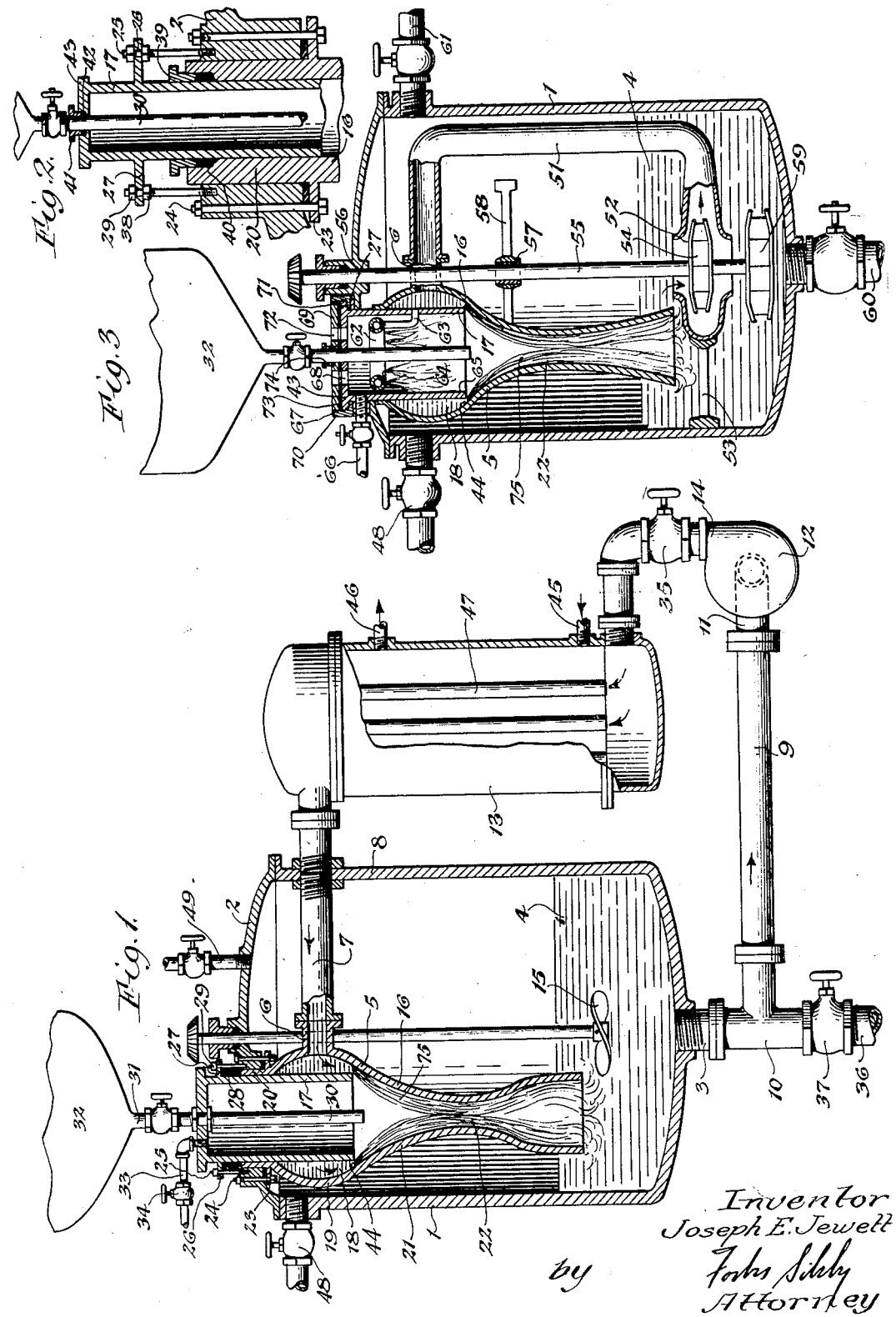
Inventor
Joseph E. Jewett
by
John Sibly
Attorney Patented Nov. 14, 1933

1,934,716

UNITED STATES PATENT OFFICE 1,934,716

METHOD OF TREATING FUSED MATERIAL AND APPARATUS THEREFOR

Joseph E. Jewett, Buffalo, N. Y., assignor to National Aniline and Chemical Company, Inc., New York, N. Y., a corporation of New York Application January 31, 1930. Serial No. 424,908

23 Claims. (Cl. 260—47)

This invention relates to treating fused material, and, more particularly, to a method and apparatus for treating fused caustic alkali which contains an organic compound in admixture therewith for the recovery of the organic compound. It relates specifically to a method and apparatus for producing indigo from a fusion mixture which contains indoxyl in admixture with caustic alkali.

In the preparation of certain organic dyestuffs, such as indigo, indanthrone, dibenzanthrone, etc., by processes well known to the art, a dyestuff intermediate is fused with caustic alkali, and at the completion of the fusion the molten fusion mixture is run into water or other diluting liquid. In practice, the water is contained in a large diluting chamber equipped with an agitator and cooling coil.

The molten caustic alkali, which usually contains a relatively small amount of water, if any, causes sudden and excessive elevation of the temperature at the point of contact with the aqueous liquid, due not only to its own sensible heat content but also to the large quantity of heat given off as heat of solution. The heat suddenly evolved is not dissipated with sufficient rapidity to prevent local decomposition and side-reactions, particularly in the presence of air, and results in a loss in yield of the desired product.

This is especially true in the production of indigo by the fusion of a phenylglycine compound (for example, potassium phenyl glycinate) with a dehydrating agent (for example, sodamide) and anhydrous caustic alkali. When the fusion mass is mixed with water it is preferable that the temperature of the resulting solution be not in excess of about 70° C., particularly when air is present. Inasmuch as the molten caustic alkali fusion mixture is at a much higher temperature, it is desirable that the mixture be cooled and that air be excluded during the solution of the melt. After the melt has been dissolved in water, the solution is mixed with air to oxidize the indoxyl to indigo.

An object of the present invention is to provide a method and apparatus for treating fused normally solid material with a liquid whereby the fused material may be quickly and intimately mixed with the liquid.

Another object of the invention is to provide a method and apparatus for treating fused normally solid material with a liquid whereby the mixture may be rapidly cooled and local overheating may be prevented.

A further object of the invention is to provide a method and apparatus for treating a fusion mixture which contains an organic compound in admixture with fused caustic alkali whereby the fusion mixture may be rapidly and effectively mixed with an aqueous liquid while preventing local overheating and decomposition.

An additional object of the invention is to provide a process and apparatus for producing indigo from a fusion mixture resulting from the fusion of a phenylglycine compound with an excess of a dehydrating agent and caustic alkali, whereby the fusion mixture may be rapidly and effectively mixed with water while preventing local overheating and decomposition, and the resulting mixture may be effectively mixed with air or other suitable oxidizing gas.

Other objects of the invention will in part be obvious, and will in part appear hereinafter.

The invention accordingly comprises the several steps and the relation of one or more of such steps with respect to each of the others, and the apparatus embodying features of construction, combination of elements and arrangement of parts which are adapted to effect such steps, all as will be exemplified in the following detailed disclosure and illustrated in the accompanying drawing. The scope of the invention will be indicated in the claims.

In the practice of the present invention the objects thereof are accomplished by providing a process and apparatus in which a liquid with which molten material is to be mixed, is caused to circulate in the form of a stream, and the molten material is added in the form of a stream to the circulating stream of liquid.

In accordance with a preferred method of operating the process of the invention, intimate mixing of the liquid and the molten material may be secured by forming the liquid into a hollow figure, more particularly a hollow cone, introducing the molten material into the hollow figure of liquid, and agitating the mixture. The proportion of molten material to liquid may be such that, at any time, a relatively small amount of molten material is being mixed with a relatively large amount of liquid. The liquid also preferably may be cooled to effect a rapid cooling of the molten material. The cooling may be accomplished by precooling the stream of liquid before it is mixed with the molten material; or by placing the liquid under a sufficient vacuum to reduce the boiling point of the liquid to the temperature to which it is desired to cool the mixture, so that any heat liberated during the mixing of the liquid with the molten material will be taken up in boiling off some of the liquid; or by a combination of the two foregoing methods. Under circumstances where the presence of air is undesirable during the mixing operation an inert atmosphere may be provided.

One form of apparatus embodying the invention, and providing for the carrying out of the process briefly described above, comprises a system for circulating a liquid in the form of a stream, and means in the system for mixing molten normally solid material with the circulating stream of liquid. In a preferred form of apparatus, the mixing means comprises a mixing vessel having means for spreading the circulating liquid into the form of a hollow figure, preferably a hollow cone, and means for introducing the molten material into the hollow of said figure. Means for cooling the liquid, means for maintaining a reduced pressure in the mixing chamber of said vessel and means for maintaining an atmosphere of gas in the mixing chamber also may be provided.

For a fuller understanding of the nature and objects of the invention, reference should be had to the following detailed description taken in connection with the accompanying drawing in which Figure 1 is a sectional view of one form of apparatus embodying the invention, Figure 2 is a fragmentary section of the mixing vessel showing a form of adjusting means, and Figure 3 is a sectional view of a modified form of apparatus.

Referring to the drawing, 1 is a closed tank having a cover 2 and a bottom outlet 3, and adapted to contain a body of liquid 4. In the embodiment shown in Figure 1, a mixing vessel 5, suitably supported within the upper portion of the tank 1, as for example from the cover 2, has a side connection 6 to a pipe 7 passing into the tank 1 through its side wall 8. A pipe 9, joined to the bottom outlet 3 by a T 10 leads to the intake 11 of a circulating pump 12. A tubular cooler 13 connects the pipe 7 to the discharge 14 of the circulating pump 12. 15 is an agitator for stirring the liquid 4.

The mixing vessel 5 comprises an outer shell 16 and an inner hollow cylinder 17 forming a chamber 18. The outer shell 16 is in the form of a bulb having a substantially spherical mid-portion 19, an outer cylindrical collar portion 20, and a depending tapered conical portion 21, forming a Venturi throat 22. The cylinder 17 and the collar portion 20 are so constructed that a close sliding fit is obtained. The cylinder 17 is of a larger diameter than the tapered conical portion 21 of the shell 16, and extends outward beyond the collar portion 20.

A flange 23 on the collar 20 of the shell 16 supports the mixing vessel 5 from the cover 2 to which it is secured by suitable means, shown as bolts 24. Stud bolts 25 mounted in the cover 2 in cooperating relation with openings 26 in a flange 27 on cylinder 17, and nuts 29 complete the means for securing the cylinder 17 within the shell 16. A suitable packing is placed between the flange 27 and cover 2.

A pipe 30 axially located within the cylinder 17, and connected to the valved bottom outlet 31 of the tank 32, serves to introduce molten material into the mixing vessel 5. A pipe 33 having a valve 34 permits the admission of air or other gases to the interior of the cylinder 17.

A valve 35 controls the flow of liquid through the circulating system, and an outlet pipe 36, connected to the T 10 and having a valve 37, is provided for emptying the tank 1. Pipes 45 and 46 provide for the circulation of cooling liquid around the tubes 47 of the cooler 13. A valved pipe 48 provides an inlet to the tank 1, and a pipe 49 provides an outlet for gases and vapors.

A modified form of mounting for the cylinder 17, whereby it may be adjusted relatively to the shell 16, is shown in Figure 2. This consists of the stud bolts 25 cooperating with the openings 26 in the flange 27, as above described, nuts 38 on the stud bolts between the flange 27 and cover 2, and nuts 29. A gland 39 fitting into a recess 40 in the collar 20, and a gland 41 fitting into a recess 42 in the outer end 43 of the cylinder 17 provide stuffing boxes for the cylinder 17 and pipe 30, respectively. Adjustment of the nuts 38 and 29 on the bolts 25 enables longitudinal adjustment of the cylinder 17 with respect to the shell 16, thereby varying the size of the annular passage 44 between the inner end of the cylinder 17 and the inner wall of the shell 16.

In the modification of the apparatus shown in Figure 3 of the drawing, the mixing vessel 5, which comprises the outer shell 16 suitably secured, as by welding, to the inner hollow cylinder 17 to form a chamber 18, and leaving an annular passage 44 between the inner end of the cylinder 17 and the inner wall of the shell 16, is supported from the cover 2 by a flange 27 on the cylinder 17.

A pipe 51 within the tank 1 leading from a submerged centrifugal pump 52 to the side connection 6 of the mixing vessel 5 serves to supply liquid to the chamber 18 of the mixing vessel. The pump 52 is supported by brackets 53 suitably secured to the inner wall of the tank 1, and is shown as having a double intake. A single intake pump, however, may also be employed, if desired. The rotor 54 of the pump is mounted on a rotatable shaft 55, journaled in a bearing 56, mounted in the cover 2, and a bearing 57 supported from the wall of the tank 1 by a spider 58. An impeller agitator 59 also mounted on the rotatable shaft 55 serves to agitate the liquid 4 in the tank 1.

A valved pipe 60 provides an outlet from the tank 1, and a valved pipe 61 serves as an outlet for gases and vapors. A vacuum pump (not shown) for maintaining a subatmospheric pressure within the tank may be connected to the outlet 61.

A spray-ring 62, connected to the chamber 18 by a pipe 63 and having the spray openings 64, supplies a spray of liquid for washing down the inner wall 65 of the cylinder 17.

A valved pipe 66 permits the admission of air or other gases to the interior of the cylinder 17. An additional means for admitting air into the cylinder 17 comprises a rotatable cap 67 adapted to cover openings 68 formed in the outer end 43 of the cylinder 17. The cap 67 is formed of a plate portion 69 and an angular ring portion 70 which are adapted to screw one into the other and enclose between them a flange 71 formed on the outer end 43 of the cylinder 17. The cap 67 also has openings 72 which are adapted upon rotation of the cap to register with the openings 68. Suitable packing 73 and a gland 74 form a seal for the cap.

In utilizing the apparatus above described for carrying out the process of the invention, tank 1 is partly filled, for example, through inlet 48, with the liquid with which the molten material is to be mixed, forming a body of the liquid 4, and the circulating pump is put into operation. Liquid is pumped from the body of liquid 4 to chamber 18 of the mixing vessel 5, from which it flows through annular passage 44 and Venturi throat 22 back into the body of liquid 4, the annular passage 44 causing it to take the form of a hollow cone 75. When circulation of a stream of liquid through this circulating system has been established, the valve in outlet 31 of tank 32 is opened, permitting a stream of the molten material contained in the tank 32 to pass into the mixing vessel 5 and mix with the hollow cone of liquid 75. The flow of liquid through the Venturi throat 22 creates a partial vacuum in the interior of the cylinder 17, and also causes turbulence, which assists in the mixing of the molten material with the liquid. Further mixing is effected by the agitator 15. Control of the relative proportions of the liquid and the molten material may be secured by regulation of the valve in outlet 31, by adjustment of the clearance between the inner end of the cylinder 17 and the inner wall of the shell 16 (that is, by variation of the size of the passage 44), by adjustment of the valve 35, or by any combination of these methods.

Cooling of the mixture of liquid and molten solid may be obtained in connection with the apparatus illustrated in Figure 1 of the drawing, by circulating cooling liquid through the tubular cooler 13 and pipes 45 and 46.

Cooling of the mixture also may be obtained in connection with the apparatus illustrated in Figure 3 of the drawing, by connecting the pipe 61 to a vacuum pump which is adjusted to reduce the pressure to the point at which the boiling point of the liquid in tank 1 at the resulting reduced pressure corresponds with the temperature to which it is desired to cool the liquid.

The operation of the process and apparatus above briefly described will be further illustrated in connection with its application to the production of indigo from a caustic alkali fusion mixture resulting from the fusion of a phenylglycine compound with a dehydrating agent and caustic alkali. It will be apparent, however, that the invention is not limited thereto and may be applied to the diluting, dissolving or quenching of similar fusion mixtures (such as, the caustic alkali fusion mixtures obtained in the manufacture of indanthrone, dibenzanthrone, and the like), or of other normally solid materials in molten condition.

A fusion mixture resulting from the fusion of the potassium salt of phenylglycine with an excess of sodamide and anhydrous caustic alkali and containing indoxyl and residual sodamide in admixture with caustic alkali in molten condition is contained in tank 32. Shortly before the fusion mixture is ready to be treated according to the process of the invention, tank 1 is filled with water to a sufficient height to cover the outlet from the mixing vessel 5, the circulating pump is put into operation, and a stream of water is pumped from the main body of water 4 to the chamber 18 of the mixing vessel, from which it flows through the annular passage 44 and Venturi throat 22 back into the body of water 4.

In utilizing a cooling device, such as apparatus of the type shown in Figure 1 of the drawing, for controlling the temperature, the temperature of the cooling liquid in cooler 13 is so adjusted that the circulating stream of water is brought to a temperature not exceeding about 40° C. In utilizing a vacuum for controlling the temperature, in accordance with the embodiment of the invention described in connection with Figure 3 of the drawing, the pressure in the tank 1 is reduced to about 150 mm. absolute which corresponds with a boiling point of about 60° C.

When circulation of the water through the system has been established, and its temperature has been properly adjusted, the valve in the outlet 31 of the tank 32 is opened and a stream of the fusion mixture contained in the tank 32 is introduced into the hollow cone of water 75, formed by the circulation of the water through the mixing vessel. Mixing of the water and fusion mass takes place with the formation of an aqueous solution of the caustic alkali and indoxyl and the liberation of ammonia gas which fills the interior of the cylinder 17 above the cone of liquid 75.

The streams of fusion mixture and circulating diluting liquid are preferably so adjusted that sufficient diluting liquid is present in the mixing vessel to dissolve completely the amount of fusion mixture present. The admixture of a relatively small amount of fusion mixture with a hollow cone of a relatively larger amount of water or aqueous caustic alkali results in a rapid reaction and dissipation of heat. The evolution of ammonia during the mixing operation is sufficient to form an air-excluding blanket of ammonia within the limited confines of the mixing vessel, which aids in preventing local decomposition.

Heat generated by solution of the substantially anhydrous caustic alkali in the water, and the sensible heat of the fusion mixture are removed from the circulating solution by the cooler 13, in the embodiment of the invention described with reference to Figure 1 of the drawing, and by the boiling off of a part of the solution under the reduced pressure conditions existing in the tank 1, in the embodiment of the invention illustrated in connection with Figure 3 of the drawing. The temperature is preferably held below about 70° C.

Fusion mixture which splashes onto the interior wall 65 of the cylinder 17 of the apparatus shown in Figure 3 of the drawing is washed into the stream of circulating dilute caustic alkali solution by the spray of solution from the spray-ring 62.

Circulation of the solution is continued until all of the fusion mixture has been introduced into it and has dissolved. Air is then admitted into the mixing vessel 5 (e. g., through the pipe 33 of Figure 1, or the pipe 66 or cap 67, or both, of Figure 3) whereby the indoxyl is oxidized to indigo. The mixing of air with the circulating aqueous caustic alkali solution in the mixing vessel 5 results in a rapid and a positive aeration of the entire solution.

It will be realized that the invention is not limited to the process and apparatus and the details thereof which are set forth in the foregoing description. Thus, the invention is not limited to the details of the process such as ingredients, proportions of ingredients, reaction temperature, pressure and the like, all of which are known to the art. Nor is it limited to the details of construction of the various parts of the apparatus disclosed.

Means other than that disclosed may be employed for forming the circulating liquid into a hollow cone, and the mixing vessel may have other forms than those illustrated. A mixing vessel of the type hereinbefore exemplified is preferred. A Venturi throat may or may not be included as a part of the mixing vessel; its inclusion is preferred, however, because the suction produced by it increases the velocity of the liquid in the mixing vessel, increases the turbulence produced by the circulating stream of liquid at its junction with the main body of liquid, and, when gas is present, aids in drawing the gas into the main body of liquid.

The inner wall of the mixing vessel, which has been illustrated as a cylindrical member, may have a different form and may be adjustable relatively to the outer member or not. An adjustable inner member is preferred, however, inasmuch as it permits variation of the size of the annular passage in the mixing vessel, thereby permitting variation of the velocity, thickness and shape of the cone of liquid in the mixing vessel.

The means for feeding the fusion mixture to be introduced into the moving cone of liquid also may be varied. A scrubbing means such as the spray-ring 62 may be employed with any of the modifications of the invention above illustrated and may be fed from an external source and with a liquid different from the circulating liquid. The construction whereby the scrubbing means is fed by the circulating liquid itself, as exemplified in Figure 3 of the drawing, is preferred.

The means for circulating the liquid may be placed interiorly or exteriorly of the tank containing the body of liquid, as above illustrated, and may comprise other means than that described. The circulating liquid may be cooled in any suitable manner, and when a cooler is employed, this may be of any suitable type.

Since certain changes in the carrying out of the above process and in the construction, combination, and arrangement of the parts set forth may be made without departing from the scope of the invention, it is intended that all matter contained in the above description and shown in the accompanying drawing shall be interpreted as illustrative and not in a limiting sense except as limited by the claims.

I claim:

1. The process of treating a molten material with a liquid which comprises circulating the liquid in the form of a stream and introducing the material in molten condition into said circulating stream of liquid.

2. The process of treating molten material with a liquid which comprises circulating the liquid in the form of a stream, forming said circulating liquid into a moving hollow figure, and introducing the material in molten condition into the hollow of said figure, thereby mixing said material with said liquid.

3. In a process of treating an aqueous liquid with a fusion mixture which contains an organic compound in admixture with caustic alkali, the improvement which comprises circulating the aqueous liquid in the form of a stream, and introducing the fusion mixture into said circulating stream of liquid.

4. In a process of treating an aqueous liquid with a fusion mixture which contains an organic compound in admixture with caustic alkali, the improvement which comprises circulating the aqueous liquid in the form of a stream, and introducing the fusion mixture in molten condition into said circulating stream of liquid.

5. In a process of treating an aqueous liquid with a fusion mixture which contains an organic compound in admixture with caustic alkali, the improvement which comprises circulating the aqueous liquid in the form of a stream, and introducing the fusion mixture into said circulating stream of liquid, while maintaining a gaseous atmosphere in contact with the mixture.

6. In a process of treating an aqueous liquid with a fusion mixture which contains an organic compound in admixture with caustic alkali, the improvement which comprises circulating the aqueous liquid in the form of a stream, forming said liquid into a moving hollow figure, and introducing said fusion mixture into the hollow of said figure, thereby mixing said liquid with said fusion mixture.

7. In a process of treating an aqueous liquid with a fusion mixture which contains an organic compound in admixture with caustic alkali, the improvement which comprises circulating the aqueous liquid in the form of a stream, cooling said liquid, and introducing the fusion mixture into said circulating stream of liquid.

8. In a process of treating an aqueous liquid with a fusion mixture which contains an organic compound in admixture with caustic alkali, the improvement which comprises circulating the aqueous liquid in the form of a stream, cooling said circulating stream of liquid, and introducing the fusion mixture in molten condition into said circulating stream of liquid.

9. In a process of treating an aqueous liquid with a fusion mixture which contains an organic compound in admixture with caustic alkali, the improvement which comprises forming said liquid into a hollow figure, and introducing said fusion mixture into the hollow in said figure.

10. In a process of treating an aqueous liquid with a fusion mixture which contains an organic compound in admixture with caustic alkali, the improvement which comprises forming said liquid into a hollow cone, and introducing said fusion mixture into the hollow in said cone.

11. In a process of treating an aqueous liquid with a fusion mixture which contains an organic compound in admixture with caustic alkali, the improvement which comprises forming said liquid into a hollow cone, introducing the fusion mixture into the hollow of said cone, and maintaining an atmosphere of inert gas over said mixture.

12. In a process of treating an aqueous liquid with a fusion mixture which contains an organic compound in admixture with caustic alkali, the improvement which comprises forming said liquid into a hollow cone, introducing the fusion mixture into the hollow of said cone, and maintaining a reduced pressure on said cone.

13. In a process of treating an aqueous liquid with a fusion mixture which contains an organic compound in admixture with caustic alkali, the improvement which comprises circulating the aqueous liquid in the form of a stream, forming said liquid into a hollow cone, reducing the pressure on the cone of liquid, and mixing the fusion mixture in molten condition with said cone of liquid.

14. In a process of treating an aqueous liquid with a fusion mixture which contains an organic compound in admixture with caustic alkali, the improvement which comprises circulating the aqueous liquid in the form of a stream, cooling said circulating stream of liquid, forming said liquid into a hollow cone, reducing the pressure on said cone of liquid, introducing the fusion mixture into the hollow of said cone of liquid, and maintaining an atmosphere of inert gas over said cone of liquid.

15. In the manufacture of indigo from a fusion mixture which contains an alkali-metal salt of indoxyl in admixture with caustic alkali, the improvement which comprises causing a body of aqueous caustic alkali solution to circulate in the form of a stream, cooling said solution, forming said circulating solution into a hollow figure, dropping said fusion mixture into the hollow of said figure, continuing the circulation of said solution, and when all of the fusion mixture has dissolved passing air into said circulating solution.

16. In the manufacture of indigo from a fusion mixture which contains an alkali-metal salt of indoxyl in admixture with caustic alkali and sodamide, the improvement which comprises causing a body of aqueous caustic alkali solution to circulate in the form of a relatively large stream, cooling said solution, forming said circulating solution into a hollow cone, dropping a relatively small stream of said fusion mixture in molten condition into the hollow of said cone, thereby forming indoxyl and ammonia, maintaining ammonia in contact with said cone, continuing the circulation of said solution, and when all of the fusion mixture has dissolved passing air into said circulating solution.

17. In the manufacture of indigo, the improvement which comprises circulating an aqueous caustic alkali solution of indoxyl in the form of a stream, forming said solution into a hollow cone, and mixing air with said cone of solution.

18. In an apparatus for treating a caustic alkali fusion mixture with an aqueous liquid to form a solution thereof, means for circulating the aqueous liquid in a stream, said means including a mixing vessel, means for introducing the fusion mixture into said mixing vessel, and means for maintaining a reduced pressure in said mixing vessel.

19. In an apparatus for treating a caustic alkali fusion mixture with an aqueous liquid to form a solution thereof, means for circulating the aqueous liquid in a stream, said means including a mixing vessel, means for introducing the fusion mixture into said mixing vessel, and means for maintaining an atmosphere of gas in said mixing vessel.

20. In an apparatus for treating a caustic alkali fusion mixture with an aqueous liquid to form a solution thereof, a mixing vessel having means for forming the aqueous liquid into a hollow figure, means for introducing the fusion mixture into the hollow of said figure, and means for maintaining an atmosphere of gas in contact with said hollow figure of liquid.

21. In an apparatus for treating a caustic alkali fusion mixture with an aqueous liquid to form a solution thereof, a mixing vessel having means for forming the aqueous liquid into a hollow cone, means for introducing the fusion mixture into the hollow of said cone, means for maintaining a reduced pressure on said cone of liquid, and means for maintaining an atmosphere of gas in contact with said cone of liquid.

22. In an apparatus for the manufacture of indigo from a fusion mixture which contains an alkali-metal salt of indoxyl in admixture with caustic alkali and sodamide, means for circulating dilute aqueous caustic alkali in a stream, means for cooling said stream of aqueous caustic alkali, means for forming said aqueous caustic alkali into a hollow cone, means for mixing the fusion mixture with said hollow cone of aqueous caustic alkali thereby forming ammonia and an aqueous solution of indoxyl, means for confining the ammonia in contact with said cone of aqueous caustic alkali, and means for mixing air with said solution.

23. In an apparatus for the manufacture of indigo from a fusion mixture which contains an alkali-metal salt of indoxyl in admixture with caustic alkali and sodamide, means for circulating dilute aqueous caustic alkali in a stream, means for cooling said stream of aqueous caustic alkali, means for forming said aqueous caustic alkali into a hollow cone, means for dropping the fusion mixture into the hollow of said cone of aqueous caustic alkali, and means for confining ammonia thereby generated in contact with said cone of aqueous caustic alkali.

JOSEPH E. JEWETT.